United States Patent [19]

Cohen

[11] Patent Number: 5,529,372
[45] Date of Patent: Jun. 25, 1996

[54] AUTOMOBILE SECURITY SEAT SYSTEM INCORPORATING SEAT CONTROL MECHANISM

[76] Inventor: Morris Cohen, 11322 Briar Forest, Houston, Tex. 77077

[21] Appl. No.: 230,100

[22] Filed: Apr. 20, 1994

[51] Int. Cl.⁶ ........................................ A47C 7/62
[52] U.S. Cl. ........................ 297/217.3; 297/341
[58] Field of Search ............... 297/344.1, 217.3, 297/217.1, 217.7, 463.2, 340, 341; 70/261; 364/424.05; 248/430

[56] References Cited

U.S. PATENT DOCUMENTS

| | | | |
|---|---|---|---|
| 4,116,297 | 9/1978 | Ross et al. | 70/261 X |
| 4,451,887 | 5/1984 | Harada et al. | 364/424 |
| 4,721,337 | 1/1988 | Tomita | 297/344.1 X |
| 5,213,388 | 5/1993 | Baker | 248/429 X |

FOREIGN PATENT DOCUMENTS

| | | | |
|---|---|---|---|
| 2908611 | 10/1980 | Germany | 70/261 |
| 4034557 | 5/1992 | Germany | 297/344.1 |

*Primary Examiner*—Milton Nelson, Jr.
*Attorney, Agent, or Firm*—Gunn & Associates

[57] ABSTRACT

A security system for an automobile having a motorized seat is set forth. The seat is equipped with a set of longitudinal guide channels and rollers which move in the channels to move the seat forwardly or rearwardly. A motor drive system is connected to the seat. A CPU memory stores instructions for operation of the motor drive to thereby vary the position of the seat with respect to the rails. When moved excessively forwardly, the seat is positioned so that a person cannot operate the steering wheel or control pedals of the vehicle.

15 Claims, 1 Drawing Sheet

U.S. Patent     Jun. 25, 1996     5,529,372
FIG.1
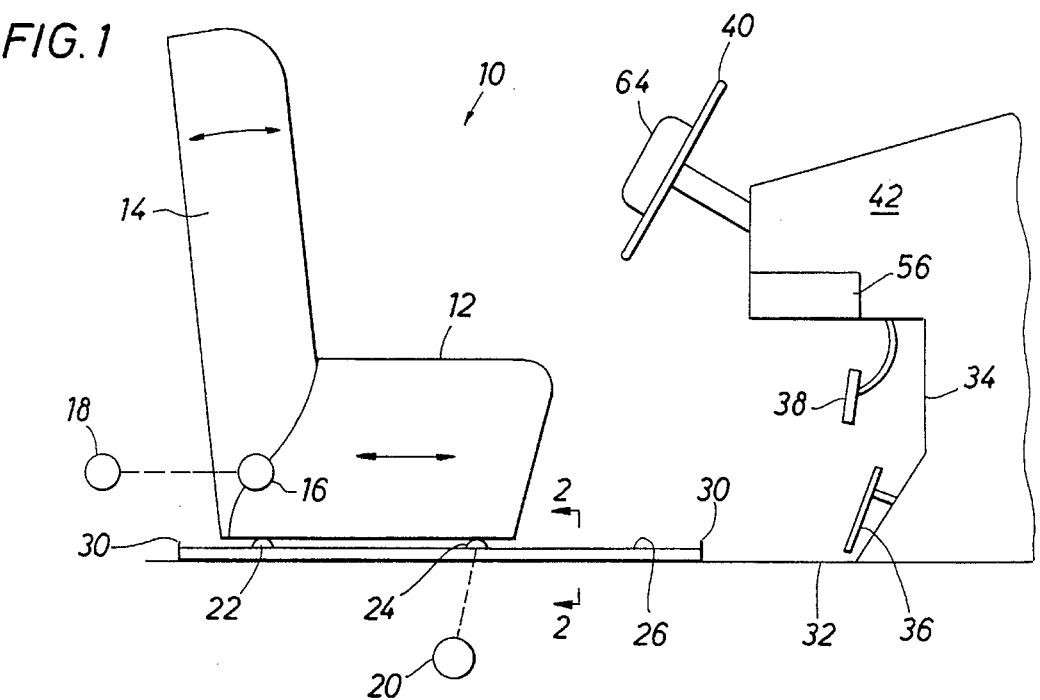
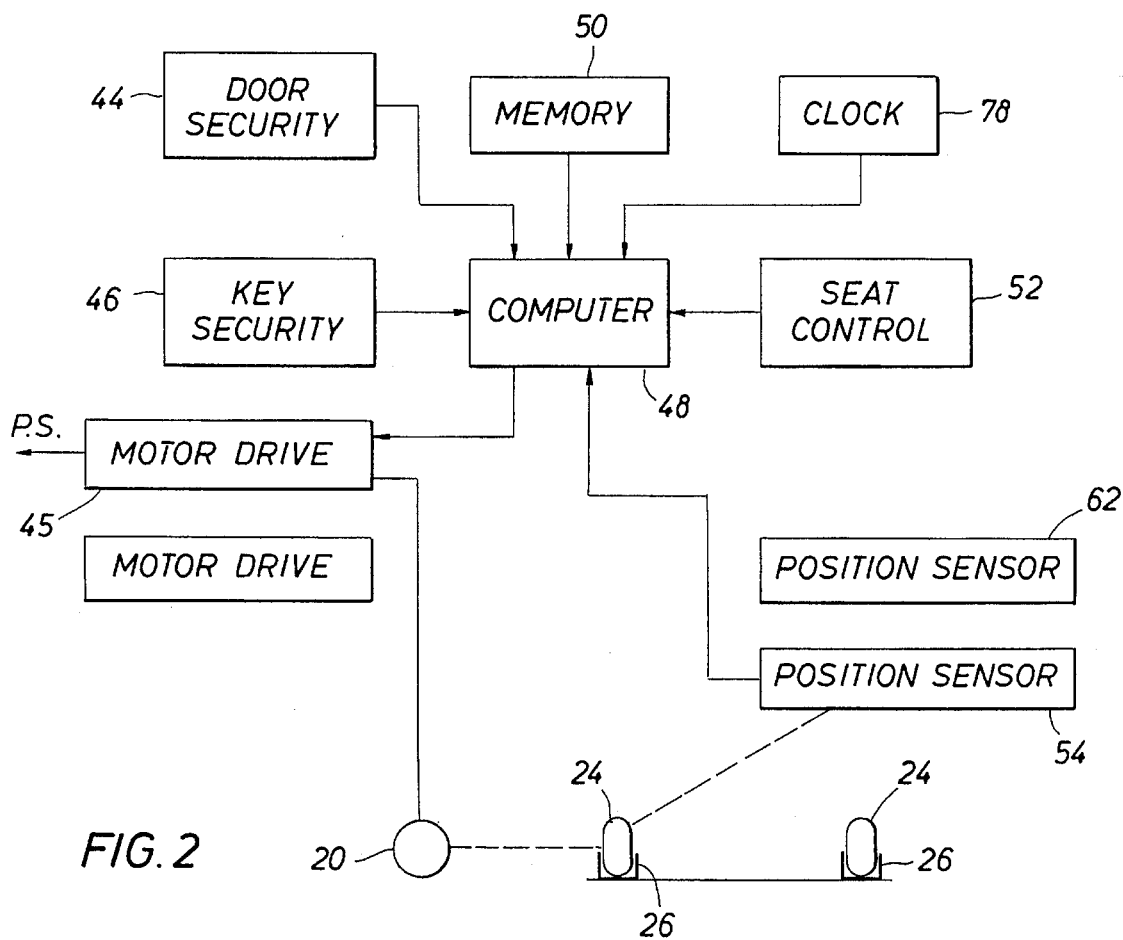
FIG.2

AUTOMOBILE SECURITY SEAT SYSTEM INCORPORATING SEAT CONTROL MECHANISM

BACKGROUND OF THE DISCLOSURE

Automobile theft is a serious risk to the owner. Automobile security systems of many types have been implemented to protect against automobile theft. The present disclosure sets forth a security system which has enhanced features to prevent theft. Moreover, the security system of the present disclosure is particularly useful with an automobile which is equipped with power operated seats. It takes advantage of the power operated seats so that seat movement is governed by the security system of this disclosure. Through this approach, the seat can be moved to a position which makes driving the vehicle substantially impossible. It makes it sufficiently impossible that a person attempting to drive the vehicle with the seat in that position will not be able to operate the pedals of the vehicle. The pedals of the vehicle include the accelerator and brake pedal. Those two pedals, and clutch as appropriate, are located beneath the dash in a recessed area in front of the seat where the operator is normally intended to position the operator's feet. The present disclosure sets forth a mechanism by which the seat is moved to a forward position so that there is no clearance for pedal operation.

The present disclosure particularly is useful for automobiles having a front seat which is moved in at least two dimensions. The two dimensions of movement typically involve forward translation of the base cushion of the seat, and rotation of the back of the seat. The two types of movement occur independently and are typically provided by operator control of several switches.

The present disclosure takes advantage of stored positions for the seat, particularly the driver seat. The driver seat is typically moved by the above mentioned two motors which change the angle of the seat back and the location of the seat cushion. For automobiles which are driven by different people of different sizes, it is possible to record seat positions which differ based on different physical sizes of the drivers. It is not uncommon for a single vehicle to be driven by a husband and wife who need markedly different seat positions as a result of differences in size. Leg length makes a significant difference in the positioning of the seat. The present disclosure is directed to a system which enables a computer memory to store seat positions for at least two drivers. The positions are stored so that the seat can be moved to the desired positions for the two respective drivers. In addition to that, there is a third position in which the seat is overdriven i.e., it is driven to a location where it is wedged up against or underneath the overhanging dash so that there is no clearance to operate the pedals. This also interferes with access to the steering wheel. This can be done even with steering wheels which are fixed in location or those which deflect upwardly or downwardly for different size drivers.

Continuing further, the present disclosure sets forth a system which is triggered by automobile security equipment such as a key security system or a door security system. Should a forced entry occur, or should some effort be made to defeat or otherwise override any of the automotive security systems, the seat is moved to the locked or secured position. For purposes of definition, movement of the seat to the extreme of its movement range will be defined as the seat security position hereinafter. The seat security position thus represents another or alternate position which is achieved by use of seat position data stored in memory. As a representative example, a first position may be that of a larger person, a second position will position the seat for a smaller person and the seat security position is the third position which is stored in memory. All of the memory positions are data stored in memory. That data is used to operate a motor, and preferably two motors, so that seat mechanization is used for security.

Summarizing the present disclosure, it sets forth a means and mechanism for operation of an electrically moveable automobile seat. The seat is at least provided with a supportive mounting such as a guide track extending forwardly and rearwardly of the vehicle. This range of movement is utilized to reposition the seat and is accomplished by moving the seat on a set of rollers which are captured in a pair of rails. The two rails preferably extend lengthwise of the vehicle so that the seat supported by them can be guided. Two rails are typically positioned beneath the driver seat for movement. If desired, the passenger seat can be moved by a separate motor to travel on separate rollers and guided by separate rails. However, since the passenger seat does not position a person immediately adjacent to the pedals and steering wheel, movement of the passenger seat is not important to the security system set forth in the present disclosure. Passenger seat movement may be important for passenger comfort.

One aspect of the present disclosure which is summarized briefly is the ability to be triggered in the event that wrongful entry into the vehicle is made whereupon the seat is moved to the seat security position. This blocks access of the steering wheel and pedals for illegal operation of the vehicle when it is stolen. This will cut down on theft.

IN THE DRAWINGS

So that the manner in which the above cited features, advantages and objects of the present invention are attained and can be understood in detail, a more particular description of the invention, briefly summarized above, may be had by reference to the embodiments thereof which are illustrated in the appended drawings. It is noted, however, that the appended drawings illustrate only typical embodiments of this invention and are therefore not to be considered limiting of its scope, for the invention may admit to other equally effective embodiments.

FIG. 1 is a side view an showing automobile seat installed relative to a steering wheel and dash and wherein the seat is moveable toward or away from the dash on rollers which are moved by a motor so that the seat travels on guide rails toward or away from the dash; and FIG. 2 is a combination, partly in section, view along the line 2—2 of FIG. 2, and schematic block diagram which illustrates a guide rail and roller for moving the seat, a motor for operation of the roller, and the circuitry which is connected in the system for operation of the motor.

DETAILED DESCRIPTION OF THE PREFERRED EMBODIMENT

Attention is now directed to FIG. 1 of the drawings which shows an automobile seat and other aspects of the interior for the purpose of setting forth a security system. The seat 10 incorporates a bottom cushion 12 and an upstanding cushion 14 which serves as the seat back. The back 14 is pivotly mounted to rotate. A pivot connection is located at 16. Rotation of the back 14 around the pivot 16 is obtained by a motor 18 which is operated to rotate in one direction or the other, thereby moving the seat back 14. A range of motion is permitted for the seat back 14. The cushion 12 is able to be moved forwardly and rearwardly. The cushion 12 is supported on a back roller 22 and a similar front roller 24. At least one and preferably both of the rollers are powered by the motor 20. When operated, the motor 20 provides for translation of the seat cushion 12. It moves forwardly or rearwardly as required. The speed depends on the power of the motor and the gear ratio of the motor. The motor implements movement of the seat which is guided by at least two channels or rails 26. In the side view of FIG. 1 of the drawings, a single, U-shaped channel is constructed with sufficient height and width to enable the channel to bracket the roller 24. The roller 24 is positioned in the channel or rail so that the seat cushion 12 is enabled to be moved forwardly or rearwardly. The channel 26 is provided with a stop 30 at the forward and also the rear end. The length of the channel and the location of the front stop 30 at the end of the channel is important to the operation of the system as will be explained. Ideally, the seat cushion 12 is at least a bucket seat provided for the driver but it also can be a bench seat which extends across the width of the vehicle. In either event, at least two or three parallel channels guide forward and backward motion of the seat cushion.

The channel 26 is attached to the vehicle floor 32. The floor extends forwardly to a fire wall 34. In the region between the floor and fire wall, the gas feed pedal 36 is located. It is operated by foot pressure in the ordinary fashion. In addition to that, the brake pedal 38 is suspended or otherwise positioned for easy operator access. Steering for the vehicle is obtained through a steering wheel 40 which functions in the intended fashion and which is supported in a position in front of and just above the dash 42. As will be understood and in the ordinary method of operation, the pedals 36 and 38 are operated to control speed of the vehicle and steering is accomplished through the steering wheel 40. All of this is done by the driver who is perched on the seat cushion 12. The steering wheel 40 supports an air bag assembly. In addition, the dash 42 supports a radio 56.

Operation of this system involves movement of the seat so that the position of the driver can ordinarily be accommodated. This may require operation of both the motors 18 and 20. To this end, the motors 18 and 20 are provided with appropriate motor drives. FIG. 2 of the drawings shows the motor 20 which is mechanically connected with one of the seat rollers 24. The seat roller 24 are received in the guide channel 26 shown in FIG. 2 of the drawings which was also mentioned with regard to FIG. 1 of the drawings. FIG. 2 further shows that the drive motor 20 is provided with a motor drive circuit 45. It is connected with a system power supply. System power supply normally provides 12 VDC for operation. FIG. 2 further shows a second motor drive circuit which is included for the motor 18 so that back movement can also be controlled.

The vehicle typically includes a door security system indicated generally at 44. There is a key security system 46. Both are input to a CPU 48 which is provided with a memory 51). The operator of the vehicle in ordinary operation is provided with a seat control input 52 which is used to load a position or measurement of movement for a particular person. If two or more drivers normally use the vehicle, two or more different seat positions can be defined and input to the memory 50. This will be explained in detail below. In fact, more than two can be input and one of those can be the position which obtains security for the vehicle as taught in the present disclosure. More specifically, the seat control 52 is an input which cooperates with a seat position sensor 54. The position sensor 54 in one embodiment is a mechanism which measures the location of the seat with respect to a fixed reference position. In one aspect of the present system, the seat can travel to the far left extreme of movement as shown in FIG. 1 of the drawings at which position it bumps against the stop 30. This prevents further transitional motion. At that location, the seat is unable to move any further. That serves as a reference point for movement along the guide rails 26. Knowing the speed of the motor 20, the diameter of the rotated wheel 24 and the speed at which the wheel 24 is rotated, travel can be determined because it is proportionally fixed to the timed interval. The rate of movement might be one inch per second. To move the seat to the right by four inches, the motor 20 must be operated for four seconds. The movement of the seat through 4 inches is thus obtained by storing in memory 50 a set of instructions which cause the motor 20 to operate for four seconds.

Continuing with FIG. 2, consider the foregoing example as one use of the system. Assume for purposes of discussion that the memory 50 is provided with the stored input which causes the seat to travel for four seconds from the left hand limit or end of the guide rails 26. This is travel of four seconds or four inches. Consider another input which is stored in memory 50 which requires the seat to travel seven inches or for seven seconds. If both values are stored, it is possible to know the location of the seat and the amount of travel then required. If the travel requires movement to the right as shown in FIG. 1 of the drawings, the measurement can be obtained either by moving the seat to the left to bump into the stop 30 and then traveling to the right, or incremental measurements can be used. For instance, if the seat has already been moved for four seconds or four inches to the right of the stop 30, then operation for an additional three seconds will provide the necessary motion to accomplish seven inches of displacement from the left hand end. Through this approach, registration of the seat with respect to the desired position can be accomplished. As will also be understood, the motor 18 is operated by a motor drive circuit also shown in FIG. 2 of the drawings, and a similar position sensor 62 is likewise used for controlling the operation of the seat back 14.

While the foregoing mentions certain aspects of operation of the car seat to move from one position to another to accommodate drivers having different height or different size, another aspect of the present invention enables the system to store another set of data in the memory 50. This set is data is the data which is stored for operation of the seat so that the seat is pushed to the most inconvenient position in the event of theft. Assume for purposes of an example that wrongful entry into the vehicle is made and the door security system 44 provides a signal indicative of this event. Alternately, assume that proper entry is accomplished through the door but the key security system detects improper operation of the ignition key. For instance, the door may be left unlocked. In that event, the key security system will detect wrongful use of the vehicle. When either of the security systems 44 or 46 provides an input signal to the CPU 48, the CPU 48 obtains instructions from the memory 50 to move the seat to the most inconvenient of locations. This can be accomplished readily simply by providing a signal which drives the seat to the right hand end of the rails as viewed in FIG. 1. This positions the seat cushion 12 as far as possible to the right. This can be located so that the gap between the seat and the dash is so small that a person cannot position their legs between the dash 42 and the seat cushion 12. Likewise the motor 18 can be operated so that the seat back 14 is rotated to the forward extreme of its permitted range of movement. Typically, this involves tilting the seat forwardly. This positions the seat forward in the most extreme position, namely, a position in which the seat back 14 is jammed against the steering wheel 40. Of course, that may depend on telescoping movement of the steering wheel, change of steering wheel angle, and other scale factors.

When the security system of the present disclosure is operated in the above mentioned fashion. The seat is moved to such a location that further use of the vehicle is made substantially impossible. This permits the vehicle to be almost totaled disabled for operation. While it is possible to override the door security system and the key security system, through the use of appropriate input signals to the CPU 48, the seat can be moved to this position which makes it substantially impossible to operate the vehicle. Indeed, if the front seat is a bench seat which spans the full width of the vehicle, this substantially forbids even a passenger from riding in a passenger seat and reaching over to the steering wheel to operate the steering wheel and the illustrated pedals 36 and 38.

The present disclosure sets forth a system which can be used successfully to prevent theft of the vehicle by moving the seat to such a location that operation of the pedal and steering wheel are substantially impossible. If this occurs, it will then be necessary for the operator to restore the seat to a desired location for subsequent use in the intended fashion. This requires that the operator input a switch operation to the seat control 52 which causes the CPU 48 to fetch from memory instructions which restore the seat to one of the desired positions. For safety sake, this can be done by utilizing a multidigit input mechanism for the seat control. In that event, the multidigit control signal is provided so that the seat is moved between the rails and moved to a position which is stored in memory. In other words, the seat can then be moved to a position which enables the operator to again drive the vehicle with the seat cushion and seat back properly positioned. This permits unlocking of the security system of the present disclosure.

By use of the CPU and the related clock, the seat can be moved to the forward stop 30 to jam against the dash 42, thereby limiting driver access after closing and locking the car. For instance, a typical interval of about two to five minutes after locking the car can be stored in the CPU memory 50 so that the seat 12 is moved fully forward, and the back 14 fully rotated. The antitheft position also reduces access to the air bag 64 and radio 56 to protect them.

The present disclosure requires only a minimum of changes to a vehicle which is equipped with motorized seats. Primarily, it requires extension of the rails to a position which is sufficiently forward of the normal operating positions of the seat cushion 12 that locking occurs between the seat and the bottom side of the dash. It also requires input of instructions to the memory 50 so that the seat can be repositioned at selected locations. Such locations ordinarily are input to the seat control mechanisms in any event the controls usually permit the storage of seat positions for people who have different sizes.

Finally, in focusing on the present invention, it is a safety or security system which reduces the risk of theft which is accomplished with damage or destruction of the vehicle. For implementation, no damage to the vehicle need occur. Moreover, once the seat is moved to the security position, it can be left in that position for a fixed interval or an interval which is terminable under operator control. The CPU 48 normally is provided with a clock and the clock can be operated so that the seat is held in the security position for a fixed interval. The clock can input some arbitrary interval such as one hour in which to maintain the seat in the security position. Indeed, through the use of a clock, the CPU 48 can be used to control operation of the motor 20 so that the seat is held for hours.

The foregoing system is installed with a minimum change in vehicle construction which is primarily concerned with extension of the rails. Likewise, the electronic components which are shown in FIG. 2 of the drawings are often present in luxury vehicles already being manufactured. They typically include a seat control switch 52 and require only an extension of the rails plus the incorporation of the position sensor 54. Since many luxury vehicles already provide seat movement specified locations, a position sensor is already present.

While the foregoing is directed to the preferred embodiment, the scope thereof is determined by the claims which follow.

I claim:

1. An automobile security system which operates in conjunction with an automobile to prevent theft, the security system which comprises:

(a) a driver seat comprising a seat cushion and a seat back positioned on a set of elongate guide rails extending lengthwise of the automobile to enable said driver seat to move forwardly and rearwardly of the automobile wherein said driver seat is supported on and guided by said guide rails, and a first motor which is operably connected with said driver seat to move said driver seat forwardly and rearwardly of the automobile, and a second motor which tilts said seat back forwardly and rearwardly with respect to said seat cushion;

(b) wherein said elongate guide rails extend sufficiently forwardly of said automobile toward automobile controls including the steering wheel and operator pedals so that said driver seat can be positioned to block the use of said automobile controls;

(c) a first motor controller connected to control said first motor so that said driver seat is moved forwardly and rearwardly of the automobile and a second motor controller connected to control said second motor so that said seat back is tilted forwardly and rearwardly, wherein a maximum forward movement of said driver seat and a maximum forward tilt of said seat back blocks the use of said automobile controls;

(d) a signal source connected to said first motor controller and to said second motor controller to cause said first motor to move said driver seat rearwardly and said second motor controller to cause said second motor to tilt said seat back rearwardly to enable the use of said automobile controls.

2. The system of claim 1 wherein said security system includes a CPU to control driver seat movement.

3. The system of claim 2 wherein said CPU cooperates with said first motor and said first motor controller and with said second motor and said second motor controller to move said driver seat and said seat back thereof to selected forward positions to block use of the automobile controls.

4. The system of claim 3 including a memory cooperating with said CPU in which at least two different driver seat positions are stored.

5. The system of claim 3 wherein first and second stops limit driver seat travel on said guide rails.

6. The system of claim 1 wherein said guide rails are a pair of parallel, channel shaped guides extending lengthwise of the automobile to terminate at front and back stops to limit driver seat travel along said guide rails.

7. The system of claim 6 wherein said front guide rail stops are located so that driver seat travel is forwardly limited.

8. A method comprising the steps of:

(a) providing an extending set of elongate guide rails extending lengthwise of an automobile;

(b) providing a driver seat comprising a seat cushion and a seat back, and further providing one or more motors which cooperate with said driver seat and said elongated guide rails;

(c) automatically moving said driver seat forwardly on said guide rails and moving said seat back forwardly to an extent that said driver seat blocks use of automobile controls; and (d) moving the driver seat to a position to enable use of the automobile controls during driving.

9. The method of claim 8 wherein said driver seat is moved forwardly on said guide rails by moving said seat cushion of said driver seat forwardly and tilting said seat back forwardly to block use of the automobile controls.

10. The method of claim 8 wherein the driver seat is automatically positioned to enable use of the automobile controls prior to use of the automobile.

11. An automobile security system which operates in conjunction with an automobile, the security system which comprises:

(a) a driver seat comprising a seat cushion and a seat back positioned on a set of elongate guide rails extending lengthwise of an automobile to enable the driver seat to move forwardly and rearwardly of the automobile wherein the driver seat is supported on and guided by said set of guide rails, and a first motor which is operably connected to move the driver seat forwardly and rearwardly of the automobile and a second motor which is operably connected to tilt said seat back with respect to the position of said seat cushion;

(b) wherein said elongate guide rails extend sufficiently forwardly of the automobile toward automobile controls including a steering wheel and driver pedals so that said driver seat blocks use of the automobile controls;

(c) said first motor moves the driver seat forwardly and rearwardly of the automobile wherein forward movement positions the seat sufficiently forwardly relative to the automobile to block use of the automobile controls, and said second motor simultaneously tilts said seat back forwardly such that said steering wheel of said automobile is further blocked from usage; and (d) a CPU controlling said first and second motors to cause the motors to move the driver seat cushion rearwardly and the seat back rearwardly to a position enabling driver use of the automobile controls after movement of the seat from the position blocking use of the automobile controls.

12. The system of claim 11 wherein said CPU cooperates with said first and said second motors to move said seat cushion and said seat back to a selected position to block use of the automobile controls.

13. The system of claim 11 including a memory storing at least two different driver seat positions and one of said positions blocks the use of the automobile controls.

14. A method of providing automobile security for protection of an automobile, which method comprises the steps of:

(a) positioning a driver seat, comprising a seat cushion and a seat back, on a set of elongate guide rails extending lengthwise of an automobile to enable the driver seat to move forwardly and rearwardly of the automobile wherein the seat is supported on and guided by said set of guide rails, and providing one or more motors which are operably connected with the driver seat to move the driver seat forwardly and rearwardly of the automobile and to tilt said seat back with respect to the position of said seat cushion;

(b) extending said elongate guide rails sufficiently forwardly in the automobile toward automobile controls including a steering wheel and operator pedals so that said driver seat moves to a position to block use of the automobile controls;

(c) automatically moving the driver seat rearwardly of the automobile so that the one or more motors move the driver seat rearwardly and tilt said seat back rearwardly to enable the driver to use the driver seat at a position enabling use of the automobile controls; and (d) automatically moving the driver seat forward after the driver leaves the automobile to a position to block use of the automobile controls.

15. The method of claim 14 wherein two motors are operated to move said seat cushion forwardly and rearwardly of the automobile and change the angle of said seat back, and wherein said motors operate independently in performing these movements.

* * * * *